(12) United States Patent
Hara et al.

(10) Patent No.: US 7,110,254 B2
(45) Date of Patent: Sep. 19, 2006

(54) INFORMATION PROCESSOR

(75) Inventors: Yasushi Hara, Kawasaki (JP);
Hideyuki Motoyama, Kawasaki (JP);
Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 9 days.

(21) Appl. No.: 11/070,302

(22) Filed: Mar. 3, 2005

(65) Prior Publication Data

US 2006/0133031 A1 Jun. 22, 2006

Related U.S. Application Data

(63) Continuation of application No. PCT/JP2003/000575, filed on Jan. 22, 2003.

(51) Int. Cl.
*G06F 1/20* (2006.01)

(52) U.S. Cl. .................................... 361/687; 710/303

(58) Field of Classification Search ................ 361/687; 710/303, 304
See application file for complete search history.

(56) References Cited

U.S. PATENT DOCUMENTS

| | | | |
|---|---|---|---|
| 5,848,282 A | 12/1998 | Kang | |
| 6,353,536 B1 * | 3/2002 | Nakamura et al. | 361/686 |
| 6,522,535 B1 * | 2/2003 | Helot et al. | 361/687 |
| 6,542,360 B1 * | 4/2003 | Koizumi | 361/687 |
| 6,674,640 B1 * | 1/2004 | Pokharna et al. | 361/687 |
| 6,687,123 B1 * | 2/2004 | Kitahara | 361/687 |
| 2002/0126431 A1 * | 9/2002 | Yanagisawa | 361/103 |

FOREIGN PATENT DOCUMENTS

| | | |
|---|---|---|
| JP | 04-354190 | 12/1992 |
| JP | 11-039063 | 2/1999 |
| JP | 11-065713 | 3/1999 |
| JP | 2908418 | 4/1999 |
| JP | 2000-003231 | 1/2000 |
| JP | 2000-075960 | 3/2000 |
| JP | 2000-207063 | 7/2000 |
| JP | 2002-031448 | 1/2002 |

* cited by examiner

*Primary Examiner*—Lisa Lea-Edmonds
(74) *Attorney, Agent, or Firm*—Staas & Halsey LLP

(57) ABSTRACT

A portable information processor in which heat generated internally is removed efficiently and noise incident to passage of an exhaust air flow generated from a cooling fan is damped in order to realize a silent information processor. The portable information processor comprises a body section including a CPU, a main memory, an input means, a display means, and the like, and an extension section including an extension power supply section, an external storage means, various interfaces, and the like, being mounted removably, the processor has an outlet for exhausting heat generated in the body to the outside thereof, a cooling fan generating an exhaust air flow being exhausted through the outlet, an inlet provided on the outer surface of an extension section, for introducing the exhaust flow generated by the cooling fan into the extension section corresponding to the outlet when the body section and the extension section are coupled, and a silencing means for damping a sound incident to passage of the exhaust air flow introduced from the inlet.

5 Claims, 6 Drawing Sheets

INFORMATION PROCESSOR

This is a continuation of International Application PCT/JP2003/000575, with an international filing date of Jan. 22, 2003.

BACKGROUND OF THE INVENTION

1. Field of the Invention

The present invention relates to a portable information processor, and more particularly relates to a portable information processor comprising a main section equipped with a CPU, a main memory, input unit, display unit, and so forth, and an extension section equipped with an extension power supply, external storage unit, various interfaces, and so forth, both detachably configured.

2. Background Information

The need for faster processing has driven up the operating frequency of the CPUs used in personal computers in recent years, and this has been accompanied by a rise in power consumption. Particularly with portable information processors such as laptop computers and PDAs, mounting density is increased in order to make the products more compact, so an increase in power consumption leads to more heat being generated.

Information processors such as these normally make use of a cooling fan or some other kind of cooling unit such as a heat sink or heat pipe, and there have been efforts to learn how efficient these are at cooling. In order to handle the full operation of the CPU, the cooling unit can be made larger, or two or more cooling unit can be employed, or the speed of the cooling fan can be raised.

Increasing the size of the cooling unit or the number of units used is contrary to the goal of making the apparatus more compact, and makes it difficult to find enough space to install the unit or units in the apparatus. If a cooling fan is operated at high speed it generates noise, requiring the installation of a silencing unit for damping this noise. This silencing unit can consist of a sound absorbent material or a silencer installed inside the apparatus, but here again this makes it difficult to find enough space to install the equipment while still maintaining a compact apparatus size, so no effective way to make the apparatus quieter has been found.

There are portable information processors comprising an extension section (called a docking station, etc.) equipped with an extension power supply, external storage unit, various interfaces, and so forth, and a main section equipped with a CPU, a main memory, input unit, display unit, and so forth, with the extension section and main section being detachable from each other. With a configuration such as this, including an extension section, it has been proposed that the cooling unit be installed on the extension section side so as to remove the heat generated on the main section side (see, for example, Japanese Patent No. 2,908,418).

In Japanese Patent No. 2,908,418, a heat sink is provided on the main section side, while a cooling unit such as a cooling fan is provided on the extension section side, and when the main section is used coupled with the extension section, the heat sink on the main section side and the cooling unit on the extension section side are connected by a thermal conductor such as silicone rubber, so that heat on the main section side is radiated on the extension section side.

It has been proposed that noise can be suppressed by controlling the speed of the cooling fan provided on the main section side according to the power supply management mode, etc. (see, for example, JP H10-11 176A).

SUMMARY OF THE INVENTION

With an information processor such as that discussed in Japanese Patent No. 2,908,418, it is possible to remove the heat generated by the main section with the cooling unit provided to the extension section, but nothing is done about the noise of the cooling fan, and therefore the noise of the cooling fan during operation and the noise produced by the passage of the exhaust flow generated by the cooling fan remain problems.

Also, with an information processor such as that discussed in JP H10-11 176A, although noise is reduced by shutting off the cooling fan while the CPU is idle, noise is still generated when the cooling fan is driven during full-power operation of the CPU.

It is an object of the present invention to efficiently remove the heat generated inside a portable information processor, and to achieve quieter operation by damping the noise that accompanies passage of the exhaust flow generated by the cooling fan.

The portable information processor according to a first aspect of the present invention comprises a main section equipped with a CPU, a main memory, input unit, display unit, and so forth, and an extension section equipped with an extension power supply, external storage unit, various interfaces, and so forth, both detachably configured. The main section comprises an outlet for exhausting to the outside the heat generated inside the main section, and a cooling fan that generates an exhaust flow for exhausting through the outlet. The extension section comprises an inlet provided on the outer surface of the extension section and corresponding to the outlet when the main section and extension section are coupled, for introducing the exhaust flow generated by the cooling fan into the extension section, and silencing unit for damping sound generated through the passage of the exhaust flow introduced from the inlet.

With this constitution, even when the main section is coupled with the extension section and the CPU is operating at full power, any sound generated through the passage of the exhaust flow produced by the cooling fan is damped by the silencing unit, affording quieter operation.

The portable information processor according to a second aspect of the present invention comprises a main section equipped with a CPU, a main memory, input unit, display unit, and so forth, and an extension section equipped with an extension power supply, external storage unit, various interfaces, and so forth, both detachably configured. The main section comprises a cooling fan that generates an exhaust flow for exhausting the air inside the main section, a thermal conduction member for transmitting the heat generated inside the main section to the proximity of the joint with the extension section, and fan regulation unit for lowering the speed of the cooling fan or halting the cooling fan when the main section and extension section are coupled. The extension section comprises cooling unit provided on the outer surface of the extension section and corresponding to the thermal conductor when the main section and extension section are coupled, for cooling the heat transmitted through the thermal conductor.

In this case, when the main section is coupled with the extension section, the thermal conduction member of the main section is connected with the cooling unit of the extension section, allowing heat to be radiated away, which unit that the cooling fan provided to the main section can be slowed down or in some cases halted, affording quieter operation.

The portable information processor according to a third aspect of the present invention is the portable information processor according to the second aspect, wherein the main section further comprises an outlet for exhausting the exhaust flow generated by the cooling fan from the main section, the extension section further comprises an inlet provided on the outer surface of the extension section and corresponding to the outlet when the main section and extension section are coupled, for introducing the exhaust flow generated by the cooling fan into the extension section, and silencing unit for damping sound generated through the passage of the exhaust flow introduced from the inlet, and the speed of the cooling fan is lowered by the fan regulation unit when the main section and extension section are coupled.

In this case, when the main section is coupled with the extension section, the outlet on the main section side and the inlet on the extension section side are connected, the exhaust flow generated by the cooling fan is guided from the main section to the extension section, and this, in conjunction with the thermal conduction member of the main section being connected to the cooling unit of the extension section, allows the interior of the main section to be cooled efficiently, and since the speed of the fan is reduced at this time, less noise is generated.

The portable information processor according to a fourth aspect of the present invention is the portable information processor according to the third aspect, the cooling unit being a second cooling fan that generates an exhaust flow for exhausting to the outside of the extension section the heat from the thermal conductor when the main section and extension section are coupled, and further comprising second silencing unit for damping sound generated through the passage of the exhaust flow generated by the second cooling fan.

In this case, heat from the main section can be efficiently removed by the exhaust flow generated by the second cooling fan, and noise accompanying the passage of the exhaust flow generated by the second cooling fan is damped, affording quieter operation.

The portable information processor according to a fifth aspect of the present invention is the portable information processor according to any of the first to fourth aspects, further comprising CPU function control unit for altering the clock and/or the drive voltage of the CPU contained in the main section, the clock and drive voltage of the CPU being controlled by the CPU function control unit such that the CPU is at its maximum performance when the main section and extension section are coupled, and the CPU is not at its maximum performance when the main section is used after being separated from the extension section.

In this case, when the main section and the extension section are coupled, heat generated by the main section can be efficiently removed while noise is suppressed, and information processing capacity can be increased by setting the CPU to maximum performance. Also, the speed of the cooling fan can be reduced by reducing CPU performance, and noise can be suppressed without diminishing the cooling effect even when the main section is used separately from the extension section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION

First Embodiment

Figure 1:
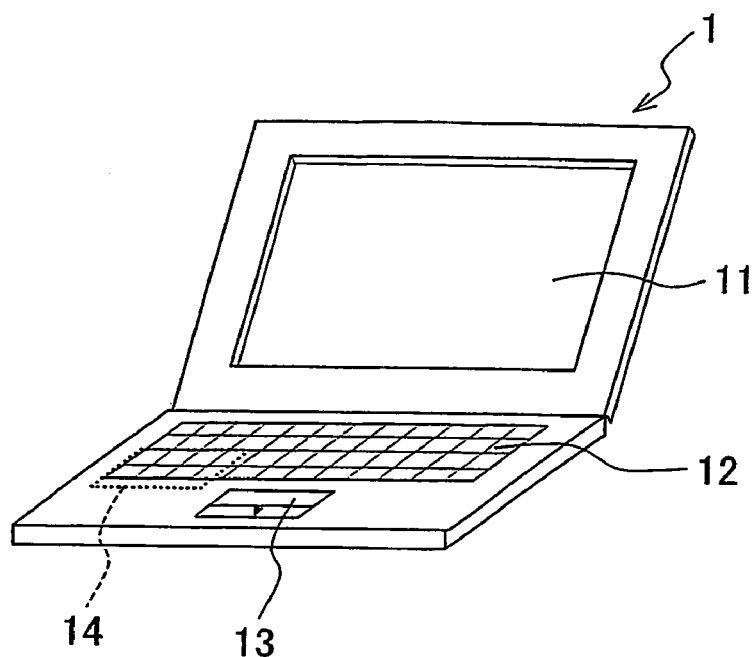
FIG. 1 is an oblique view illustrating a first embodiment of the present invention.
Figure 2:
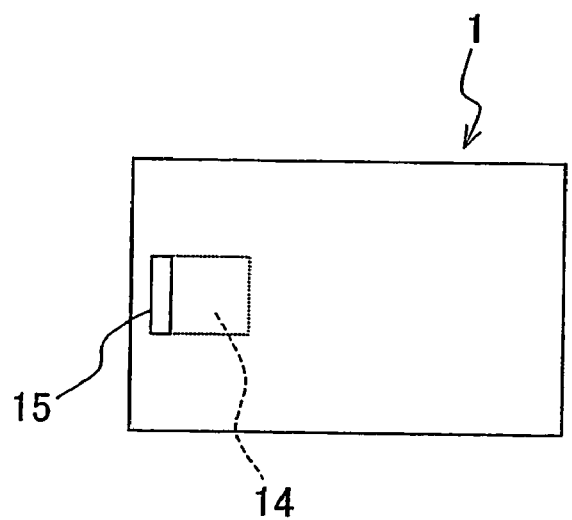
FIG. 2 is a bottom view of the main section.

The first embodiment of the present invention will be described through reference to FIGS. 1 to 4.

The portable information processor of the first embodiment is constituted by a main section 1 and an extension section 2, which are detachably configured.

The main section 1 is equipped with a liquid crystal display panel or other such display component 11, a keyboard 12 on which a plurality of keys are arranged, a pointing device 13 (comprising a touch panel, track ball, or the like), and so forth, and internally contains a motherboard (not shown) on which are mounted a CPU, a main memory, and so forth, a battery (not shown), and so forth.

Also, a cooling fan 14 that generates an exhaust flow for drawing in air from the vicinity of heat generating components such as the CPU or a graphics chip and exhausting this air to the outside is provided on the inside of the main section 1. As shown in FIG. 1, an outlet 15 for exhausting the exhaust flow generated by the cooling fan 14 to below the main section 1 is provided on the underside of the main section 1. The outlet 15 can be designed so that it is shut when the main section 1 is separated from the extension section 2, and is opened when the main section 1 is coupled with the extension section 2.

The extension section 2 is equipped with an extension power supply that is connected to an AC adapter or the like for supplying power to the main section 1; external storage unit, such as a CD-ROM drive, DVD drive, or flexible disk drive; various interfaces, including connecting terminals for external devices; and so forth. On the top of the extension section 2 is formed a structure that receives the main section 1 and allows physical coupling. This affords an electrical connection that permits the exchange of various types of data and the supply of power to the main section 1 when the main section 1 is coupled with the extension section 2.

Figure 4:
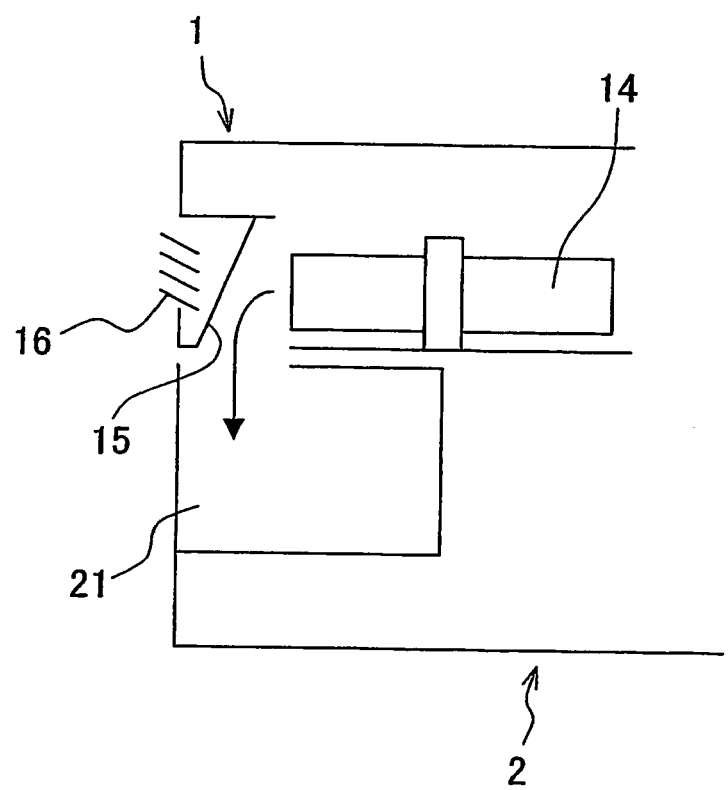
FIG. 4 is a partial vertical cross section when the two sections are coupled.

An inlet 20 for introducing the exhaust flow generated by the cooling 14 fan into the extension section 2 is provided to the extension section 2 at a location corresponding to the outlet 15 of the main section 1 (see FIG. 4). A silencing unit 21 for damping noise generated through the passage of the exhaust flow introduced into the extension section 2 is provided in the interior of the inlet 20. The silencing unit 21 can be constituted, for example, by a sound absorbent material such as a glass wool or ceramic sound absorbent board that has been applied to the inner surface of the exhaust flow passage, or by a silencer consisting of fins or the like protruding from the inner surface of the passage, which reduce the speed of the fluid passing therethrough.

Figure 3:
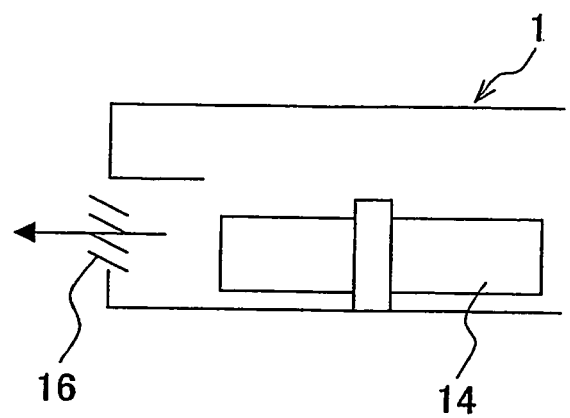
FIG. 3 is a partial vertical cross section of the main section.

With this first embodiment, when the main section 1 is used separately from the extension section 2, the outlet 15 is shut, as shown in FIG. 3. As a result, the exhaust flow generated by the cooling fan 14 is exhausted to the outside through an exhaust port 16 provided to the side of the main section 1.

When the main section 1 and the extension section 2 are used after being coupled, as shown in FIG. 4, the exhaust port 16 is shut and the outlet 15 is opened, leading to the inlet 20 of the extension section 2. Therefore, the exhaust flow generated by the cooling fan 14 is guided through the outlet 15 and the inlet 20 to the silencing unit 21, where noise is damped, and the flow is then exhausted to the outside of the extension section 2.

Therefore, with this first embodiment, when the main section 1 and the extension section 2 are used in a coupled state, any noise produced by the cooling fan 14 can be silenced by the silencing unit 21, so there is no need to lower the speed of the cooling fan 14, which unit that noise can be suppressed while maintaining a good cooling effect, even when the CPU is kept at high performance.

Second Embodiment

Figure 5:
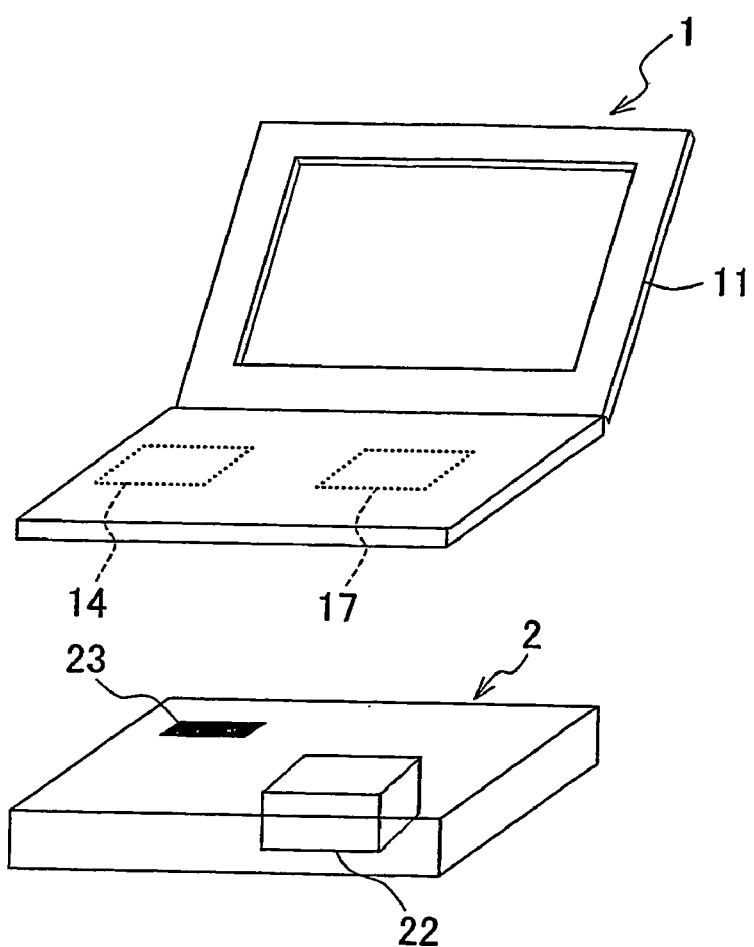
FIG. 5 is an oblique view illustrating a second embodiment of the present invention.

A second embodiment of the present invention will be described through reference to FIGS. 5 to 7.

The portable information processor according to this second embodiment is the same as that in the first embodiment in that it comprises a main section 1 and an extension section 2 that are detachably configured.

The main section 1 is equipped with a liquid crystal display panel or other such display component, a keyboard on which a plurality of keys are arranged, a pointing device (comprising a touch panel, track ball, or the like), and so forth (not shown), and internally contains a motherboard (not shown) on which are mounted a CPU, a main memory, and so forth, a battery (not shown), and so forth.

Also, a cooling fan 14 that generates an exhaust flow for drawing in air from the vicinity of heat generating components such as the CPU or a graphics chip and exhausting this air to the outside is provided on the inside of the main section 1. The exhaust flow generated by this cooling fan 14 is exhausted through an exhaust port (not shown) formed on the side of the main section 1.

Figure 6:
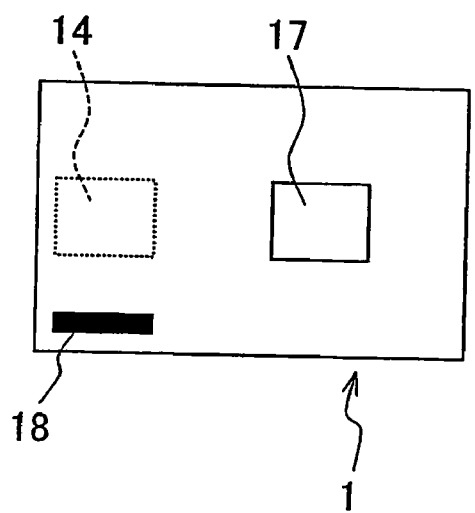
FIG. 6 is a bottom view of the main section.

As shown in FIG. 6, a thermal conduction member 17 that transmits the heat generated inside the extension section 2 to the underside of the extension section 2, and a connector 18 for providing electrical connection when the main section 1 and the extension section 2 are coupled, are provided to the underside of the main section 1.

The thermal conduction member 17 comprises silicone rubber, a heat pipe, or the like, and transmits the heat generated near the CPU to the proximity of the joint between the main section 1 and the extension section 2.

The connector 18 is equipped with a power supply connector for receiving the power supplied from the extension section 2 side, a signal connector for sending and receiving data between the main section 1 and the extension section 2, and so forth, and is connected to a connector provided at a corresponding location on the extension section 2 when the main section 1 and the extension section 2 are coupled.

The extension section 2 is equipped with an extension power supply that is connected to an AC adapter or the like for supplying power to the main section 1; external storage unit, such as a CD-ROM drive, DVD drive, or flexible disk drive; various interfaces, including connecting terminals for external devices; and so forth.

On the top of the extension section 2 is formed a structure that receives the main section 1 and allows physical coupling. A connector 23 that connects with the connector 18 of the main section 1 when the main section 1 and the extension section 2 are coupled is also provided.

A cooling unit 22 is disposed on the top of the extension section 2 at a location corresponding to the thermal conduction member 17 of the main section 1 when the main section 1 and the extension section 2 are coupled. This cooling unit 22 can comprise a thermal conduction member such as silicone rubber or a heat pipe, the upper surface of which comes into contact with the thermal conduction member 17 and transmits heat to the extension section 2 side, or can comprise heat radiating fins that protrude downward.

Figure 7:
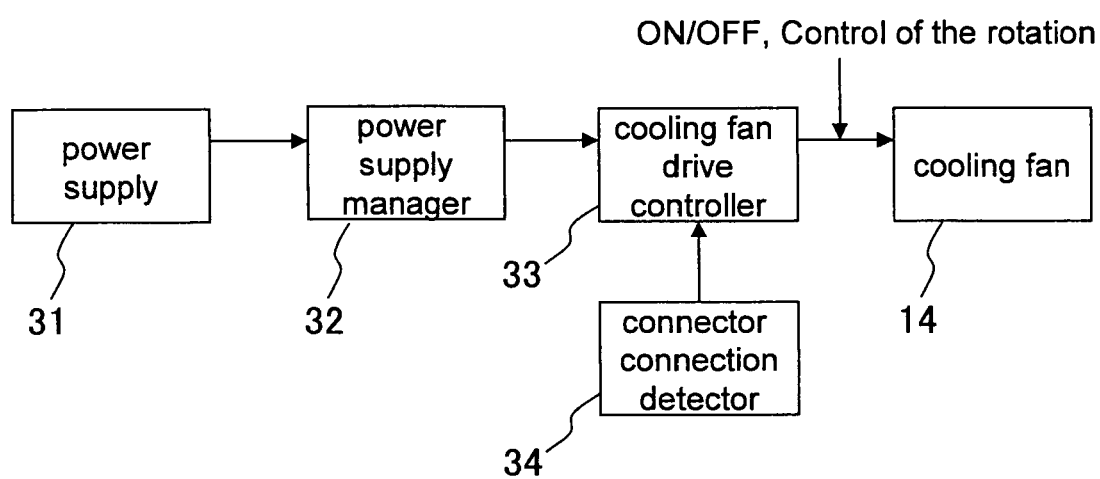
FIG. 7 is a control block diagram of the fan regulation unit.

FIG. 7 is a simplified block diagram of the fan regulation unit used for controlling the rotation of the cooling fan 14.

This fan regulation unit comprises a power supply 31, a power supply manager 32, a cooling fan drive controller 33, and a connector connection detector 34.

The power supply 31 supplies the electrical power used by the main section 1. In a state in which the main section 1 is separated from the extension section 2, power is supplied from a battery housed in the main section 1, but when the main section 1 has been coupled with the extension section 2, the power is supplied from the extension section 2.

The power supply manager 32 manages the power supplied from the power supply 31, and manages the operating state of other functional components, and the current state of power supply.

The connector connection detector 34 determines whether or not the connector 18 of the main section 1 and the connector 23 of the extension section 2 are connected, and transmits this determination result to the cooling fan drive controller 33.

The cooling fan drive controller 33 controls the rotation of the cooling fan 14, decides the target speed of the cooling fan 14 on the basis of the connection determination result from the connector connection detector 34, or the power supply state managed by the power supply manager 32, and supplies the cooling fan 14 with a control signal on the basis of this decision.

The cooling fan drive controller 33 is designed so as to lower the speed of the cooling fan 14 in such cases as when the supplied power is unstable, when the battery charge is low, or when the CPU clock or drive voltage is being restricted on the basis of the power supply state managed by the power supply manager 32.

When the connector connection detector 34 detects a state of connection between the connectors 18 and 23, the cooling fan drive controller 33 either lowers the target speed of the cooling fan 14, or halts the cooling fan 14. The reason for this is that when the connector connection detector 34 detects a state of connection, the thermal conduction member 17 of the main section 1 and the cooling unit 22 of the extension section 2 are connected, and any heat generated by the main section 1 can be radiated away through the thermal conduction member 17 and the cooling unit 22. Therefore, even if the cooling fan 14 has been lowered in speed or stopped, heat generated in the main section 1 can be radiated away, noise can be suppressed, and the CPU can be used at maximum capacity without diminishing the cooling effect.

Third Embodiment

Figure 8:
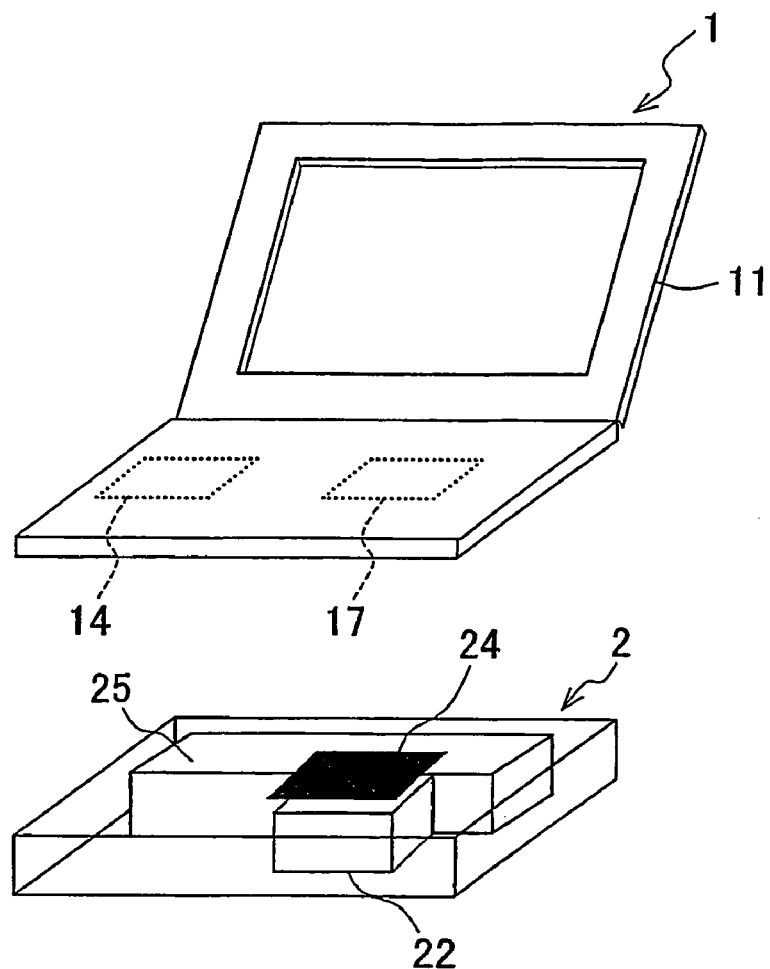
FIG. 8 is an oblique view illustrating a third embodiment of the present invention.

A third embodiment of the present invention will be described through reference to FIGS. 8 and 9.

The portable information processor according to this third embodiment is the same as that in the first embodiment in that it comprises a main section 1 and an extension section 2 that are detachably configured.

The main section 1 is equipped with a liquid crystal display panel or other such display component 11, a keyboard on which a plurality of keys are arranged, a pointing device (comprising a touch panel, track ball, or the like), and so forth (not shown), and internally contains a motherboard (not shown) on which are mounted a CPU, a main memory, and so forth, a battery (not shown), and so forth.

Also, a cooling fan 14 that generates an exhaust flow for drawing in air from the vicinity of heat generating components such as the CPU or a graphics chip and exhausting this air to the outside is provided on the inside of the main section 1. The exhaust flow generated by this cooling fan 14 is exhausted through an exhaust port (not shown) formed on the side of the main section 1.

Figure 9:
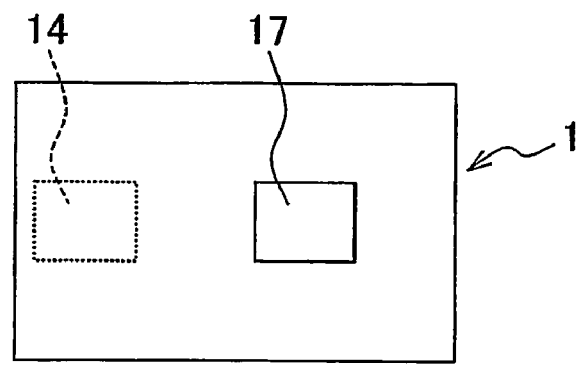
FIG. 9 is a bottom view of the main section.

As shown in FIG. 9, a thermal conduction member 17 that transmits the heat generated inside the extension section 2 to the underside of the extension section 2 is provided to the underside of the main section 1.

The thermal conduction member 17 comprises silicone rubber, a heat pipe, or the like, and transmits the heat generated near the CPU or a graphics chip provided to the underside of the main section 1.

The extension section 2 is equipped with an extension power supply that is connected to an AC adapter or the like for supplying power to the main section 1; external storage unit, such as a CD-ROM drive, DVD drive, or flexible disk drive; various interfaces, including connecting terminals for external devices; and so forth.

On the top of the extension section 2 is formed a structure that receives the main section 1 and allows physical coupling.

A thermal conduction unit 24 is further provided to the top of the extension section 2 at a location corresponding to the thermal conduction member 17 of the main section 1 when the main section 1 and the extension section 2 are coupled. This thermal conduction unit 24 can comprise silicone rubber or a heat pipe, just as with the thermal conduction member 17 of the main section 1.

A cooling unit 22 to which heat from the main section 1 is transmitted via the thermal conduction unit 24 is disposed on the inside of the extension section 2. This cooling unit 22 can comprise a second cooling fan that generates an exhaust flow for exhausting to the outside the heat transmitted by the thermal conduction unit 24.

The exhaust flow generated by the cooling unit 22 (second cooling fan) is guided to a second silencing unit 25 provided adjacent to the cooling unit 22. This second silencing unit 25 can be constituted, for example, by a sound absorbent material such as a glass wool or ceramic sound absorbent board that has been applied to the inner surface of the exhaust flow passage, or by a silencer consisting of fins or the like protruding from the inner surface of the passage, which reduce the speed of the fluid passing therethrough, and damps sound generated through the passage of the exhaust flow generated by the cooling unit 22.

With this third embodiment, the cooling unit 22 can be constituted by a heat sink or heat pipe, allowing the second silencing unit 25 to be eliminated.

Thus, with this third embodiment, when the main section 1 is coupled with the extension section 2, efficient cooling can be accomplished by the cooling unit 22 provided on the extension section 2 side, and the cooling fan 14 housed in the main section 1 can be reduced in speed or stopped. Also, when a second cooling fan is provided as the cooling unit 22, silencing can be accomplished by the second silencing unit 25. Further, when a heat sink or heat pipe is used as the cooling unit 22, even if the cooling unit 22 is made larger in order to improve cooling efficiency, it will not encroach on the space inside the main section 1 since it is disposed on the extension section 2 side.

Fourth Embodiment

Figure 10:
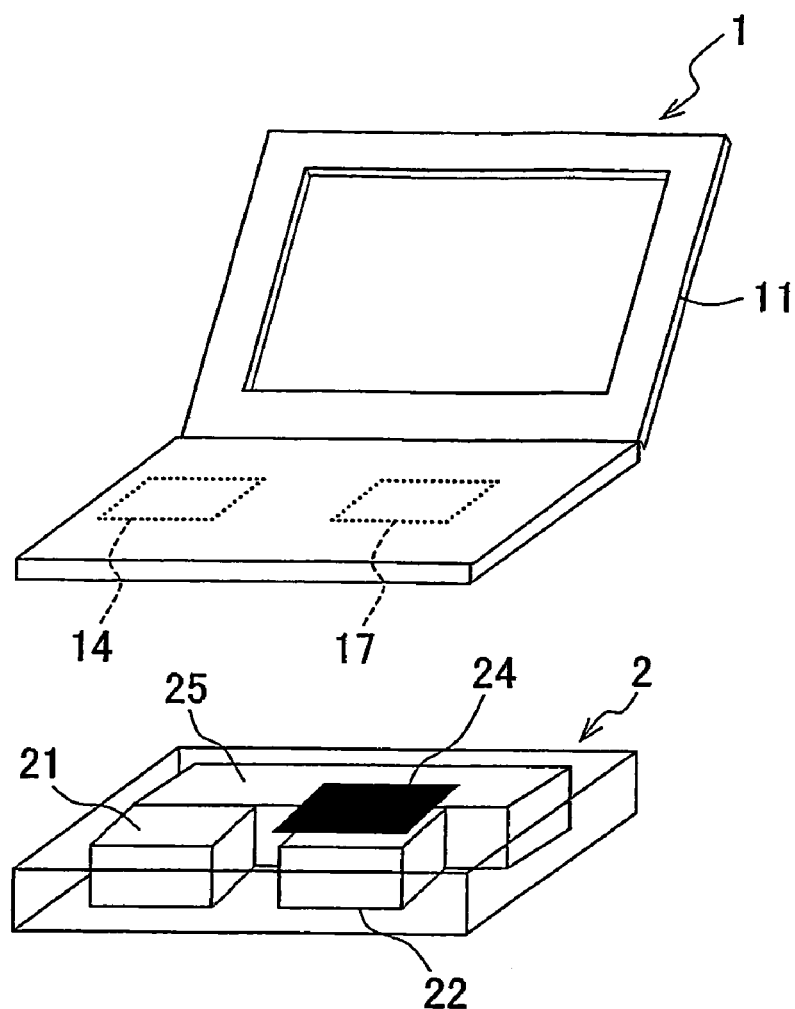
FIG. 10 is an oblique view illustrating a fourth embodiment of the present invention.
Figure 11:
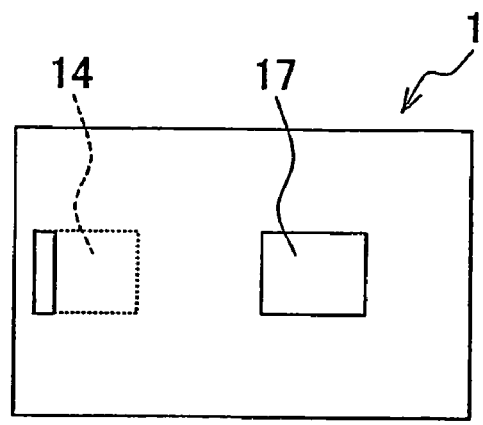
FIG. 11 is a bottom view of the main section.

A fourth embodiment of the present invention will be described through reference to FIGS. 10 and 11.

The portable information processor according to this fourth embodiment is the same as that in the first embodiment in that it comprises a main section 1 and an extension section 2 that are detachably configured.

The main section 1 is equipped with a liquid crystal display panel or other such display component 11, a keyboard on which a plurality of keys are arranged, a pointing device (comprising a touch panel, track ball, or the like), and so forth (not shown), and internally contains a motherboard (not shown) on which are mounted a CPU, a main memory, and so forth, a battery (not shown), and so forth.

Also, a cooling fan 14 that generates an exhaust flow for drawing in air from the vicinity of heat generating components such as the CPU or a graphics chip and exhausting this air to the outside is provided on the inside of the main section 1. As shown in FIG. 11, an outlet 15 for exhausting the exhaust flow generated by the cooling fan 14 to below the main section 1, and a thermal conduction member 17 that transmits the heat generated inside the extension section 2 to the underside of the extension section 2, are provided on the underside of the main section 1.

The outlet 15 is designed so that it is shut when the main section 1 is separated from the extension section 2, and is opened when the main section 1 is coupled with the extension section 2.

The thermal conduction member 17 comprises silicone rubber, a heat pipe, or the like, and transmits the heat generated near the CPU or a graphics chip to the proximity of the joint between the main section 1 and the extension section 2.

The extension section 2 is equipped with an extension power supply that is connected to an AC adapter or the like for supplying power to the main section 1; external storage unit, such as a CD-ROM drive, DVD drive, or flexible disk drive; various interfaces, including connecting terminals for external devices; and so forth. On the top of the extension section 2 is formed a structure that receives the main section 1 and allows physical coupling. This affords an electrical connection that permits the exchange of various types of data and the supply of power to the main section 1 when the main section 1 is coupled with the extension section 2.

An inlet (not shown) for introducing the exhaust flow generated by the cooling 14 fan into the extension section 2 is provided to the extension section 2 at a location corresponding to the outlet 15 of the main section 1. A silencing unit 21 for damping noise generated through the passage of the exhaust flow introduced into the extension section 2 is provided in the interior of the inlet. The silencing unit 21 can be constituted, for example, by a sound absorbent material such as a glass wool or ceramic sound absorbent board that has been applied to the inner surface of the exhaust flow passage, or by a silencer consisting of fins or the like protruding from the inner surface of the passage, which reduce the speed of the fluid passing therethrough.

A thermal conduction unit 24 is further provided to the top of the extension section 2 at a location corresponding to the thermal conduction member 17 of the main section 1 when the main section 1 and the extension section 2 are coupled. This thermal conduction unit 24 can comprise silicone rubber or a heat pipe, just as with the thermal conduction member 17 of the main section 1.

A cooling unit 22 to which heat from the main section 1 is transmitted via the thermal conduction unit 24 is disposed on the inside of the extension section 2. This cooling unit 22 can comprise a second cooling fan that generates an exhaust flow for exhausting to the outside the heat transmitted by the thermal conduction unit 24.

The exhaust flow generated by the cooling unit 22 (second cooling fan) is guided to a second silencing unit 25 provided adjacent to the cooling unit 22. This second silencing unit 25 can be constituted, for example, by a sound absorbent material such as a glass wool or ceramic sound absorbent board that has been applied to the inner surface of the exhaust flow passage, or by a silencer consisting of fins or the like protruding from the inner surface of the passage, which reduce the speed of the fluid passing therethrough, and damps sound generated through the passage of the exhaust flow generated by the cooling unit 22.

With this fourth embodiment, the outlet 15 is shut when the main section 1 is separated from the extension section 2. As a result, the exhaust flow generated by the cooling fan 14 is exhausted to the outside through an exhaust port (not shown) provided on the side of the main section 1.

When the main section 1 and the extension section 2 are coupled, the exhaust port is shut and the outlet 15 is opened, leading to the inlet of the extension section 2. Therefore, the exhaust flow generated by the cooling fan 14 is guided through the outlet 15 and the inlet to the silencing unit 21, where noise is damped, and the flow is then exhausted to the outside of the extension section 2.

Also, the heat generated by the main section 1 is transmitted through the thermal conduction member 17 and the thermal conduction unit 24 to the cooling unit 22 of the extension section 2. When the cooling unit 22 is constituted by a second cooling fan, silencing is accomplished by a second silencing unit 25, after which the exhaust flow is exhausted to outside of the apparatus.

Therefore, with this fourth embodiment, when the main section 1 is coupled with the extension section 2, efficient cooling can be accomplished by the cooling fan 14 and the cooling unit 22, and silencing can be accomplished by the silencing unit 21 and the second silencing unit 25. Also, when the cooling unit 22 is constituted by a second cooling fan, silencing can further be accomplished by either reducing the speed of the cooling fan or stopping the cooling fan.

In addition, when a heat sink or heat pipe is used as the cooling unit 22, even if the cooling unit 22 is made larger in order to improve cooling efficiency, it will not encroach on the space inside the main section 1 since it is disposed on the extension section 2 side.

With the present invention, the heat generated inside a portable information processor can be efficiently removed, and quieter operation can be achieved by damping the noise that accompanies passage of the exhaust flow generated by the cooling fan.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A portable information processor, comprising a main section equipped with a CPU, a main memory, input unit, display unit, and an extension section equipped with an extension power supply, external storage unit, various interfaces, both detachably configured,
   wherein the main section comprises:
   an outlet for exhausting to the outside the heat generated inside the main section; and
   a cooling fan that generates an exhaust flow for exhausting through the outlet,
   and the extension section comprises:
   an inlet provided on the outer surface of the extension section and corresponding to the outlet when the main section and extension section are coupled, for introducing the exhaust flow generated by the cooling fan into the extension section; and
   silencing unit for damping sound generated through the passage of the exhaust flow introduced from the inlet.

2. The portable information processor according to claim 1, further comprising CPU function control unit for altering the clock and/or the drive voltage of the CPU contained in the main section, the clock and drive voltage of the CPU being controlled by the CPU function control unit such that the CPU is at its maximum performance when the main section and extension section are coupled, and the CPU is not at its maximum performance when the main section is used after being separated from the extension section.

3. A portable information processor, comprising a main section equipped with a CPU, a main memory, input unit, display unit, and an extension section equipped with an extension power supply, external storage unit, various interfaces, both detachably configured,
   wherein the main section comprises:
   a cooling fan that generates an exhaust flow for exhausting the air inside the main section;
   a thermal conduction member for transmitting the heat generated inside the main section to the proximity of the joint with the extension section; and
   fan regulation unit for lowering the speed of the cooling fan or halting the cooling fan when the main section and extension section are coupled,
   and the extension section comprises:
   cooling unit provided on the outer surface of the extension section and corresponding to the thermal conductor when the main section and extension section are coupled, for cooling the heat transmitted through the thermal conductor.

4. The portable information processor according to claim 3,
   wherein the main section further comprises an outlet for exhausting the exhaust flow generated by the cooling fan from the main section,
   the extension section further comprises:

an inlet provided on the outer surface of the extension section and corresponding to the outlet when the main section and extension section are coupled, for introducing the exhaust flow generated by the cooling fan into the extension section; and silencing unit for damping sound generated through the passage of the exhaust flow introduced from the inlet, and the speed of the cooling fan is lowered by the fan regulation unit when the main section and extension section are coupled.

5. The portable information processor according to claim 4, the cooling unit being a second cooling fan that generates an exhaust flow for exhausting to the outside of the extension section the heat from the thermal conductor when the main section and extension section are coupled, and further comprising second silencing unit for damping sound generated through the passage of the exhaust flow generated by the second cooling fan.

* * * * *